US006232880B1

(12) United States Patent
Anderson et al.

(10) Patent No.: US 6,232,880 B1
(45) Date of Patent: May 15, 2001

(54) ANIMAL CONTROL SYSTEM USING GLOBAL POSITIONING AND INSTRUMENTAL ANIMAL CONDITIONING

(75) Inventors: Dean M. Anderson; Craig S. Hale, both of Las Cruces, NM (US)

(73) Assignee: The United States of America as represented by the Secretary of Agriculture, Washington, DC (US)

( * ) Notice: Subject to any disclaimer, the term of this patent is extended or adjusted under 35 U.S.C. 154(b) by 0 days.

(21) Appl. No.: 09/353,713

(22) Filed: Jul. 14, 1999

(51) Int. Cl.[7] .................................................. G08B 23/00
(52) U.S. Cl. ................................ 340/573.3; 340/573.1; 340/573.4; 119/421; 119/721
(58) Field of Search ........................... 340/573.1, 573.3, 340/573.4, 825.49, 825.54; 119/14.03, 719, 721, 421, 908

(56) References Cited

U.S. PATENT DOCUMENTS

| | | | |
|---|---|---|---|
| 5,121,711 | 6/1992 | Aine | 119/721 |
| 5,195,455 | * 3/1993 | Lely et al. | 119/14.03 |
| 5,207,178 | 5/1993 | McDade et al. | 119/859 |
| 5,353,744 | * 10/1994 | Custer | 340/825.49 |
| 5,379,224 | * 1/1995 | Brown et al. | 340/989 |

(List continued on next page.)

OTHER PUBLICATIONS

Thomas M. Quigley et al. "Livestock Control with Electrical and Audio Stimulation" *Rangeland 12(3)* (Jun. 1990) pp.152–155.

M.C. Udal. "GPS Tracking of Cattle on Pasture" presented at 1998 American Society of Agricultural Engineers Meeting Sponsored by ASAE Orlando, FL (Jul. 11–16, 1998).

Peter K. Fay et al. "Containment of Free–Ranging Goats using Pulsed–Radio–Wave–Activated Shock Collars" *Applied Animal Behavior Science*, 23 (1989) pp. 165–171.

J.L. Albright et al. "Behavioral Responses of Cows to Auditory Training" *Journal of Dairy Science 49* (1966) pp. 104–106.

Andrew F. Rose "An Alternative to Fences" *Rangelands 13(3)* (June 1991) pp. 144–145.

S.M. Rutter et al. "Use of GPS to identify the grazing areas of hill sheep" *Computers and Electronics in Agriculture 17(1997)* pp. 177–188.

Ian A.R. Hulbert et al. "A note on the circadian rhythm and feeding behavior of sheep fitted with a lightweight GPS collar" *Applied Animal Behavior Science 60(1998)* pp. 359–364.

(List continued on next page.)

*Primary Examiner*—Van T. Trieu
(74) *Attorney, Agent, or Firm*—M. Howard Silverstein; Randall E. Deck; John D. Fado

(57) ABSTRACT

A device worn externally (or parts of which may be inserted in the ear canal) by an animal which uses a programmable repertoire of bilaterally applied aversive stimuli for the autonomous control of an animal's location and direction of movement is disclosed. Electromagnetic signals and electromechanical hardware are activated through a dedicated, embedded computer system, that allows a cascade of one or more aversive stimuli, normally acoustic and/or electrical stimulation, to be bilaterally applied to either the right or left side of an animal as a cue to change its location through a specific direction of movement. Aversive stimuli are programmed to be administered only when an animal penetrates a predetermined boundary. The embedded computer uses satellite position system data to determine the animal's location with respect to the closest boundary line and then calculates when and to which side of the animal the repertoire of bilateral aversive stimuli is to be applied.

27 Claims, 5 Drawing Sheets

U.S. PATENT DOCUMENTS

| | | | | |
|---|---|---|---|---|
| 5,408,956 | | 4/1995 | Quigley | 119/720 |
| 5,477,228 | * | 12/1995 | Tiwari et al. | 342/357 |
| 5,533,470 | | 7/1996 | Rose | 119/721 |
| 5,636,597 | | 6/1997 | Van Curen et al. | 119/720 |
| 5,682,839 | * | 11/1997 | Grimsley et al. | 119/721 |
| 5,791,294 | * | 8/1998 | Manning | 119/721 |
| 5,857,433 | | 1/1999 | Files | 340/573.3 |
| 5,868,100 | * | 2/1999 | Marsh | 119/421 |
| 5,949,350 | * | 9/1999 | Gigad et al. | 340/573.3 |

OTHER PUBLICATIONS

Katheryn Bennett et al. "Determination of Locational Error Associated With Globe Positioning System (GPS) Radio Collars in Relation to Vegetation and Topography in North–Central New Mexico" published by Los Alamos National Laboratory LA–13252–MS UC–908 & UC–902, *Determination ofLocational Error Associated With Global Positioning System (GPS) Radio Collars in Relation to Vegetation and Topography in North–Central New Mexico* (Feb. 1997).

* cited by examiner

ANIMAL CONTROL SYSTEM USING GLOBAL POSITIONING AND INSTRUMENTAL ANIMAL CONDITIONING

BACKGROUND OF THE INVENTION

1. Field of the Invention

This invention relates to a novel method and apparatus for the control of animals without ground-based fencing.

2. Description of the Prior Art

Livestock, particularly ruminants such as cattle, as well as other animals including pigs, horses, burros and other monogastrics, are currently controlled within defined inclusion zones (pastures) by ground-based fencing. Fences may be constructed of various building materials including metal alloys, wood and stone. Wire is the most common modern conventional fencing material for controlling animals on large areas. Wire fencing can take various forms including individual smooth and barbed wires or a combination of individual wires woven into fabrics of various design and heights. Wire fencing requires attachment to a ground-based support, most commonly a wood, metal, concrete, plastic or synthetic polymer post. Insulators may be required between the wire and the post if electrical charge is to be carried in the wires.

The need for wire material and its subsequent support make wire fence expensive on a per lineal distance basis. Add to the cost of materials the labor required to install the fence and additional labor required to maintain these structures and substantial economic costs are incurred using this method of animal control. In addition, ground-based fences have critical disadvantages above those associated with direct costs. Most ground-based fencing systems are not easily moved on a frequent basis and as such their static position on the landscape thwarts flexible management, especially those strategies focused on promoting proper utilization of the vegetation resource. Neither the vegetation resource nor the herbivory among ecosystems is static in time or space. Therefore, it logically follows that control of foraging animals on these ecosystems should likewise not be static. Fragile ecosystems, such as riparian areas, are not served well by conventional fencing systems that inhibit flexible management. These ecosystems require the flexible spatial and temporal control of animals which conventional fencing systems cannot provide on a cost affective basis. Furthermore, conventional wire fencing is considered by many to have undesirable aesthetic implications in addition to disrupting the movement of many wildlife species.

In the recent past electronic-based containment systems have been described for several animal species, particularly pets and specifically canines. However, electronic devices for controlling livestock have also been described (Quigley, U.S. Pat. No. 5,408,956). All previously described electronic systems for controlling animal location require ground-based equipment in addition to devices attached to an animal. The ground-based transmitters are located at remote and fixed locations but always within range of the most-distant transponder in the system (Janning, U.S. Pat. No. 5,241,923). The transmitter emits a signal which is picked up by a receiver worn by the animal. Most systems relay on Radio Frequency (RF) signals generated from ground-based transmitters; however, some systems utilize near infrared (McCarney et al., U.S. Pat. No. 5,608,381) or compressional wave beams (Bianco, U.S. Pat. No. 5,640,932). Frequently the receiver is attached to a collar (Gonda, U.S. Pat. No. 5,099,797) that is worn around the animal's neck. The aversive stimuli are either under manual or automatic ground-based control. Before the invention described herein, only voice commands (Yarnall, Sr. et al., U.S. Pat. No. 4,745,882) and human activation of the aversive stimuli were employed in an attempt to return an animal to the area from which it had escaped.

Some devices have been developed to keep individual animals apart over short ranges (Davis et al., U.S. Pat. No. 5,575,242 and Van Curen et al., U.S. Pat. No. 5,636,597). Aversive stimuli in prior art are administered to the animal solely at the discretion of an observer and not bilaterally. Depending on the skill of the human handler in interpreting and initiating stimulation, desirable changes in the behavior of the animal vary. The sequence of stimuli used to alter behavior in prior art occur in various combinations to condition the animal to give a reasonably predictable response to enhance the animal's safety and/or usefulness to the owner.

All previous ground based electronic containment systems depended on line-of-sight to transmit signals to the animal wearing the receiver. Hence undulating topography has limited the usefulness of prior art to relatively small zones of inclusion in which animals could be monitored and controlled. Only recently have RF signals emanating from satellites been incorporated into animal control devices but only to provide accurate information on animal location. The current uses of the Global Positioning System (GPS), especially in biology, appear to be focused on determining the location of animals or in Precision Agriculture on the agronomic application or removal of materials from fields. Using GPS as a technology to train animals has only been referenced by Files (Files, U.S. Pat. No. 5,857,433). Until recently GPS and more specifically Differential (DGPS) has been investigated as a tool for steering inanimate objects (Herring, 1996, Scientific American, 274(2):44–50).

In general, prior art operates through a field transmitter (e.g., Janning, U.S. Pat. No. 5,241,923) that emits a continuous, coded signal of designated strength. This electronic signal defines a zone, from which animals are to be excluded. Where systems have been described to operate remotely frequently there are wires laying on or just below the surface of the ground to serve as ground-based transmitters or emitters to make contiguous loops (Touchton et al., U.S. Pat. No. 5,435,271). If above ground transmitters are used ⅛ to ½ mile separation has been reported between transmitters and receivers (Gonda, U.S. Pat. No. 5,193,484). Signals emanating from a central point (Brose, U.S. Pat. No. 4,898,120) or a lobe of radiation enclosing animals can be rotated around a fixed point in a 360° circle (Aine, U.S. Pat. No. 5,121,711) to facilitate rotational grazing. However, the relatively short distances over which electronic signals can be beamed with ground based systems makes prior art of minimal usefulness for animal control over vast areas and variable topography.

Power requirements continue to present a challenge to electronic animal control systems. Grimsley et al. (U. S. Pat. No. 5,682,839) has incorporated motion sensors to power down systems when the animals are not in motion as a means to conserve battery power.

Psychological and ethological literature abounds on the use of instructional conditioning to train animals to avoid aversive stimuli. Apparatuses using conditioning to administer aversive stimuli to domestic pets have been patented under the title of training and restraining systems including Westrick et al., U.S. Pat. No. 5,559,498.

Sound and electric shock transducers apply the predominant forms of motivational stimuli. Acoustic audio stimuli include beeps (Custer, U.S. Pat. No. 5,465,687), whistles (Fury, U.S. Pat. No. 3,980,051) or a combination of sounds (Gonda et al., U.S. Pat. No. 4,335,682) including the human voice (Yarnall, Jr. et al., U.S. Pat. No. 5,565,850; Kim et al., U.S. Pat. No. 5,605,116) used in conjunction with electrical shock in various patterned combinations (Gonda et al., U.S. Pat. No. 4,802,482), sequences and durations.

Electric shock is normally administered from a single pair of electrodes. An attempt has been described for reducing the occurrence of spurious signals that could induce aversive stimuli to an animal when it was not requested by the handler (Touchton et al., U.S. Pat. No. 5,576,694). McDade et al. (U.S. Pat. No. 5,207,178) describes a shock collar that contains one fixed pair of electrodes and two individual electrodes that can be moved to different positions on the collar.

Current art appears to utilize acoustic stimuli in combination with electric shock without regard to applying it to a specific location and side of the animal in order to change the animal's direction of movement. Furthermore, motivational stimuli in current art are not easily changed once established (Touchton et al., U.S. Pat. No. 5,435,271) and at best appear limited to only a few preset levels (Gonda et al., U.S. Pat. No. 4,802,482). For example, in one device the level of electric shock stimulation could only be varied by interchanging electrode structures having various resistances (Gonda et al., U. S. Pat. No. 5,471,954). This limitation in prior art makes it difficult if not impossible to change stimuli patterns in real-time based upon immediate management needs and conditions.

SUMMARY OF THE INVENTION

This invention describes a method and a device attached to a free-ranging animal that will change the animal's location and direction of movement through one or a series of cues (aversive stimuli) administered bilaterally to either the right or left side of the animal's body and/or head. Control of an animal's direction of movement with this invention utilizes the animal's instinctive tendency to move away from an uncomfortable or stress-inducing stimulus, and/or the ability of a subject animal to be trained or conditioned to move in a specific, predetermined direction in response to application of a stimulus on one selected side thereof. The cues are only administered should the animal attempt to leave a zone of inclusion and enter a zone of exclusion by penetrating a boundary separating the two zones.

The device integrates a satellite positioning system such as the GPS with electro-mechanically applied bilateral aversive stimuli such as acoustic sound and/or electric shock. The position of a subject animal is monitored with the satellite positioning system, and these data are then used to determine the location of the animal and its direction of movement relative to a predetermined programmable boundary or boundaries, and the angle of incidence between the animal's direction of movement and the nearest boundary. When an animal attempts to leave a zone of inclusion defined by the boundary, the device will cue the animal to change both its direction of movement and location based upon a repertoire of bilaterally applied aversive stimuli. Upon contacting or penetrating a boundary, an aversive stimulus, or more preferably a cascade of aversive stimuli, will be applied autonomously to either the right or left side (bilateral stimulation) of the animal thereby inciting it to move in a direction away from the boundary and back into the zone of inclusion.

In accordance with this discovery, it is an object of this invention to provide a method and apparatus for autonomously controlling an animal's location without the need for ground-based equipment.

It is also an object of this invention to provide a method and apparatus for controlling an animal's direction of movement and thus its location, by selectively delivering various forms of aversive stimuli to either the left or right side of the animal.

Another object of the invention is to provide a method and apparatus for keeping animals confined within a specified geographic area or out of another area, or for controlling the movement of animals relative to one another.

Yet another object of the invention is to provide a method and apparatus wherein the intensity of the aversive stimulus is increased and/or additional stimuli causing greater distress are applied after the animal fails to respond to initial stimuli and continues to move nearer to a zone of exclusion.

Other objects and advantages of this invention will become readily apparent from the ensuing disclosure.

DETAILED DESCRIPTION OF THE INVENTION

Figure 1:
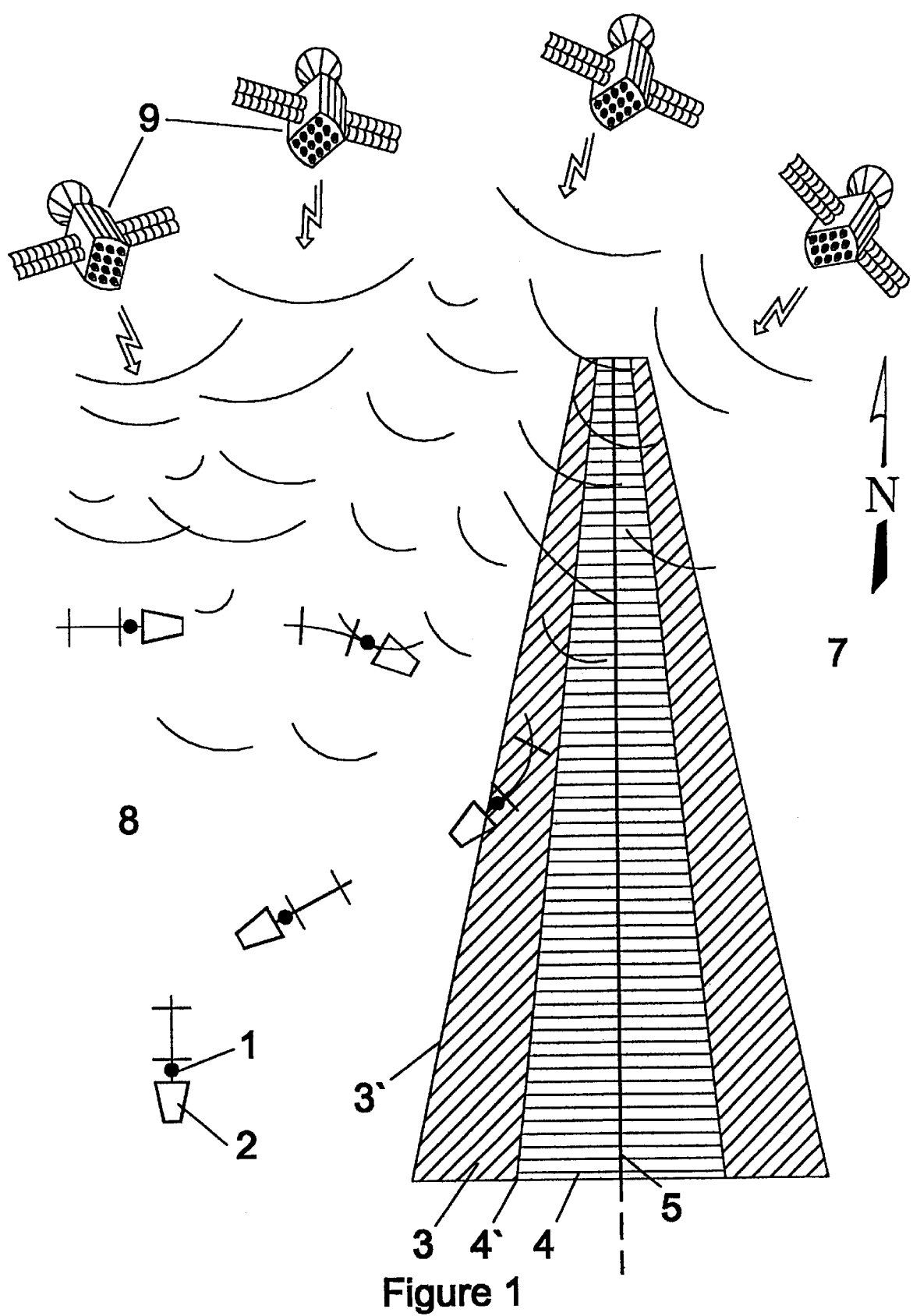
FIG. 1 shows an animal (2) wearing the device (1) of the invention while moving in an easterly direction toward a line of demarcation or boundary line (5) separating a zone of inclusion (8) from a zone of exclusion (7). Four threshold lines are also selected outwardly from the boundary line (5), two of which lie within the zone of inclusion, and two within the zone of exclusion. The first or furthest west of these threshold lines (3') corresponds to the location or region (3) at which a first aversive stimulus (acoustic) is applied to the animal when crossed. The second or intermediate threshold line (4') corresponds to the location or region (4) at which a second aversive stimulus (electric shock with acoustic stimulation) is applied should the animal continue toward the boundary line. Radio Frequency (RF) signals emanating from Global Position System (GPS) satellites (9) are received by the GPS antenna (17, see FIG. 3) on the animal and are used to determine the animal's location with respect to the closest boundary line (5).

The method and apparatus of this invention may be used to change the location and direction of movement of a wide variety of animals over virtually any landscape or topography. Animals which may respond to this device encompass both wild and domesticated animals, ranging from pets to large domestic or wild animals, including large game mammals, primates, and other mammals. The location of any of these animals could be monitored with this device in addition to altering the subsequent direction and movement of the wearer. However, the invention is particularly suited to the management of range or farm animals foraging over large geographic areas such as pastures where the installation and/or maintenance of ground-based electrical cables or fences is labor intensive and costly, as well as animals located at least in part within terrains not suited to electrical cables or fences (e.g. mountains or swamps). The invention can be used for controlling animals including, but not limited to, primates, perissodactyla, and artiodactyla, preferably bovine, caprine, equine, ovine, and porcine, and most preferably cattle, goats, horses, sheep, and pigs.

Control or alteration of an animal's direction of movement in this invention utilizes the selective application of bilateral aversive sensory stimuli to either the left or right side of the animal. As defined herein, suitable aversive stimuli are any stimuli which the animal is capable of perceiving and discerning the side to which they are applied, and include not only stimuli causing discomfort to the subject animal, but also those which do not cause discernible discomfort. For example, the preferred aversive stimuli for use herein are acoustic stimuli and/or electric shock stimuli. Without being limited thereto, it is also envisioned that other stimuli which could be used include vibrations, pricking of the skin or hide, or pinching. In any event, the aversive stimuli are administered only when an animal penetrates a boundary or an optional initial threshold line (3') of a boundary and then only on the side of the animal and over a duration of time adequate to produce maximum animal movement away from the line over the shortest possible route of travel.

Practice of this invention relies upon the ability of an animal, either by instinct or by training or instrumental conditioning, to respond to the application of an aversive stimulus on one side of its body (including the torso, legs, or neck) or head by moving in a predictable and repeatable direction (i.e., either to its left or right). Typically, most animals will instinctively move in a direction or to the side away from an uncomfortable or stress-inducing stimulus. The conditioning of most domestic animals to respond in a predetermined direction may be enhanced by training to consistently move in response to the application of a stimulus on one selected side thereof. In the preferred embodiment, the subject animals will generally be trained to move away from the side to which the aversive stimuli is applied, thereby reinforcing the instinctive behavior of the animal. However, it is also understood that the animal may be trained to move in a direction toward the same side as an applied stimulus. This is particularly suitable for mild stimuli which cause little or no discomfort to the animal.

Prior to use, the handler will select the sides of the animal to which stimuli will be administered to effect movement to the animal's right or left. One side of the animal will be designated for the application of stimuli to incite the animal to move to its left, and the other side for stimuli application to effect its movement to its right. This response may be taught to the animal by training or it may be instinctive. Techniques for training animals are well known in the art and are suitable for use herein, and include the methods described by Smith (Moving 'Em: A Guide to Low Stress Animal Handling, The Graziers Hui, Kamuela, HI, 1998, the contents of which are incorporated by reference herein).

In accordance with a preferred embodiment of the invention shown in FIG. 1, the subject animal (2) will be fitted with an apparatus (1) which includes a stimulus unit effective for selectively applying one or more of the above-described stimuli to the left or right side of its body, neck or head, and a satellite positioning system receiver, such as a GPS receiver, effective for determining the animal's position. Boundary line(s) or line(s) of demarcation (5) are designated which separate an area (8) in which the animal is to be retained or included from an area (7) which the animal is to be excluded, and the position or coordinates of the line (5) input into a microprocessor which is in communication with the GPS receiver and stimulus unit. Boundary lines or lines of demarcation (5) may be straight or curved, planar or 3-dimensional. In a particularly preferred embodiment, one or more optional threshold lines (3' and 4') positioned outwardly from the boundary line (5) into the area of inclusion (8) and exclusion (7) are also selected. A first threshold line (3') may designate the positions or regions (3) at which a first stimulus is initially applied as the animal approaches the boundary line. Additional threshold lines (4') positioned intermediate between the first threshold line and boundary line (5) may designate positions or regions (4) where the intensity of the stimulus is increased or a different stimulus causing greater stress is applied if the animal continues to move toward the boundary line. However, it is also understood that designation of such spaced threshold lines is optional, in which event the boundary line (5) is itself the threshold line at which administration of stimuli is triggered.

As the subject animal moves within the zone of inclusion its position is periodically or continuously monitored while the animal is moving using the satellite positioning system with satellites (9), and its position relative to the threshold lines and/or boundary lines as well as its direction of movement relative to the nearest line are determined. The microprocessor compares the position of the animal and its direction of movement with the position of the threshold lines and boundary lines to determine if a line has been contacted or crossed, and to determine which side of the animal is nearest to this line (i.e., determining the angle of incidence between the path of travel of the animal and the line). Once it has been determined that a threshold line (or boundary line) has been contacted or crossed, the microprocessor will initiate application of the selected stimulus to that side of the animal which will cause it to move in the direction away from the line in the shortest distance. If on the other hand the animal has moved out of the zone of inclusion and into the zone of exclusion the aversive stimuli will be applied to the side of the animal that would encourage the shortest distance of travel to bring the animal back to the boundary line in an attempt to reposition the animal to re-enter the zone of inclusion.

The determination of the side to which the stimulus is applied is based upon the animal's position (within the zone of inclusion or exclusion), the angle of incidence between the animal's direction of travel and the threshold line (or boundary line), and the animal's expected response to the bilateral stimulation (through training or instinct). If the animal is within the area of inclusion and the angle of incidence is acute or substantially less than 90° (generally, less than about 80°), then the aversive stimuli will be applied on the side of the animal that will move the animal into the obtuse angle it forms with the threshold line or boundary line. This will maximize the distance of separation between the threshold line and the animal's position with the minimum change in the animal's bearing. If the animal's bearing of movement toward a threshold or boundary line is approximately perpendicular (generally between about 80–100°), the side to which the stimuli are applied once the animal contacts the line is determined entirely randomly by the microprocessor. This logic also holds if the animal approaches an intersection of two threshold or boundary lines. The stimuli are applied to the side of the animal to produce movement away from the closest line (i.e. the side adjacent the smallest angle). If the animal's angle of approach to the lines bisects the angle of intersection of the two lines (such as 45° in a right angle corner), the side to which the stimuli are applied once the animal penetrates the boundary is chosen at random or arbitrarily.

Unless the animal has been trained to respond otherwise, contact with or penetration of the threshold line (or boundary line) from within the zone of inclusion will preferably default to aversive stimuli being applied on the side of the animal that forms an acute angle with the line regardless of whether the threshold line is in front of or behind the animal (i.e., to the side of the animal nearest to the line). This preferred embodiment assumes an animal will move away from an aversive stimuli rather than toward it. However, immediately upon an animal crossing a boundary line into an area of exclusion the invention autonomously activates maximum aversive stimuli (e.g., maximum intensity acoustic plus electric stimuli) on the side of the animal forming an obtuse angle with the boundary line that is now behind the animal. In this configuration the aversive stimuli will stimulate the animal to move toward the boundary line and reenter the area of inclusion. This direction of movement brings the animal closer to the boundary line with the least deflection in the bearing angle and distance of travel. If the animal turns approximately 180° to face the boundary line the aversive stimuli are switched to the opposite side of the animal which now forms an obtuse angle with the boundary line. If the animal proceeds to reenter the zone of inclusion the aversive stimuli are once again switched to the animal's other side which now forms an acute angle with the boundary line that is behind the animal. Aversive stimuli are preferably administered until the animal leaves the area between the first threshold line and the boundary line. If the animal refuses to leave the zone of exclusion and reenter the zone of inclusion the acoustic and or electric shock can be programmed to stop being administered after a predetermined interval to prevent ineffective and inhumane stress to the animal.

As described above, the invention not only functions to keep animals in an area of inclusion, but also to autonomously herd animals as in the case of returning an animal from a zone of exclusion back into a zone of inclusion. The size, shape and location of inclusion and exclusion zones are determined entirely by management goals and husbandry skill.

In an alternative embodiment, the boundary lines can be programmed to surround individual animals wearing the device of the invention. With this configuration the invention can be used to control animal density among animal groups as well as potentially manage specific mating pairs among multi-sire groups. In this embodiment, the boundary lines are not static but are established a predetermined distance from the subject animals. In contrast with the previously described embodiments using fixed boundary lines, the changing positions of the animals relative to one another will necessitate that the GPS data identifying the position of each animal be compared with the other animals. Consequently, the position data for each animal must be transmitted (using an RF transponder for example) to the microprocessor's of the other animals and/or to a central microprocessor effective for determining the relative position's of the animals. Upon determination that one animal is approaching a second animal from which it is to be separated, aversive stimuli are administered in the same manner as described above. However, if the density of the animals becomes exceedingly high such that a subject animal is surrounded by more than one substantially equidistant boundary lines, then the unit will default to a random application of the aversive stimuli.

Figure 2:
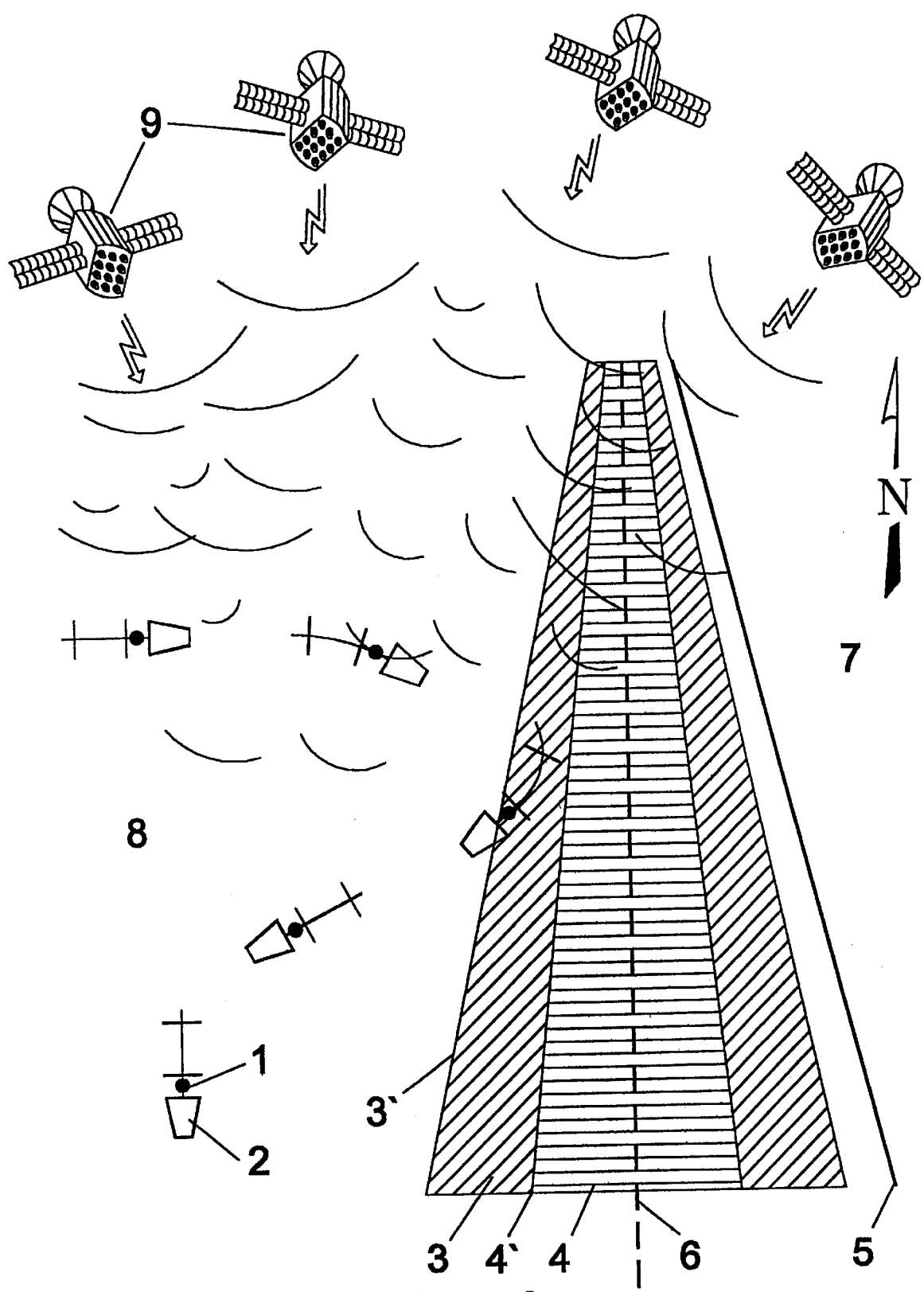
FIG. 2 shows the same operation as FIG. 1, but also illustrates the error introduced into the determination of the position of the subject animal and boundary lines which results from the introduction of Selective Availability (SA) into the Global Positioning System (GPS) signal. As a consequence of SA, the virtual boundaries recognized by the system may fluctuate a variable distance about the actual coordinates of the desired boundary line (5).

The exact kind, duration and sequence of aversive stimuli together with the exact geographic location where application of the aversive stimuli begins, i.e., distance of the threshold lines from the boundary line, as well as the locations where additional stimuli are applied, and/or the intensity of the stimuli are increased, are programmable and have previously been entered into the device's microprocessor, either directly or through a hard-wire or a wireless communication link. The stimuli can be programmed to be administered in a cascade fashion from least to most aversive with numerous intermediate settings. From the initial (acoustic) to the final (electrical shock) stimuli the animal is provided a range of opportunities to alter its forward bearing of travel. Preferably, acoustic stimulation will be administered immediately after the animal contacts or penetrates the first threshold line into the area between the threshold and boundary lines, and the aversive stimuli may be increased to electric shock in tandem with the acoustic stimuli as the animal nears or arrives at the boundary line. Should the animal not change its bearing of movement and cross the boundary line into the zone of exclusion the maximum aversive stimuli's repertoire (acoustic plus shocks) are programmed to be administered, with only brief periods of non stimulation, in an attempt to rapidly move the animal back into the zone of inclusion. For instance, optional additional threshold lines may be positioned within the zone of exclusion (as shown in FIGS. 1 and 2) which designate locations from the boundary line at which the stimuli are reduced if the animal continues to move away from the boundary line into the zone of exclusion.

Satellite navigation or positioning system technologies suitable for use herein are well known in the art. In the United States, the most common of these is the NAVSTAR Global Positioning System (GPS), although the Russian GLONASS system is also available. Briefly, GPS is a three dimensional satellite-based radio navigation and positioning system for determining where an object is on or above the surface of the earth. Though the GPS data received by all receivers is the same, how data are used varies among applications. The constellation of 24 satellites each orbiting the earth once every 12 hrs in 6 paths allows a position on earth to be very precisely and accurately located in a reproducible fashion. The RF signals include a data stream with positional data indicating a satellite's current position and time data indicating the time the satellite transmitted the data stream.

In order to accurately determine the position of a GPS unit, data from a minimum of three satellites must be received. The receiver's current latitude and longitude or other two-dimensional information, such as the receiver's travel direction, is then calculated based on the positional data of a satellite and on a time difference between transmission of the data stream from a satellite and receipt of the data stream by the receiver. If signals from four satellites are obtained simultaneously an accurate three-dimensional position including the altitude along with latitude and longitude can be obtained.

Currently, conventional, low cost civilian GPS receivers have an accuracy of within ±100 meters. This error is the result of inherent variation in the system and the practice of the U.S. military of intentionally interfering with the timing of the satellite signals in a random manner. This interference, which is referred to as Selective Availability (SA), is introduced into the signals for security purposes. Corrections for SA have become available to civilian users but at a higher cost. The most well-known correction is referred to as Differential GPS (DGPS). It provides up to millimeter accuracy, with meter accuracy being easily obtained. DGPS uses fixed receiver stations to receive GPS signals which can then be used to calculate ionosphere corrections into the received signals and retransmit the corrected information to mobile GPS receivers. The GLONASS system developed by Russia and which went into operation in 1996 may also be used herein. GLONASS is similar to GPS, but provides unencoded signals which are not subjected to any intentionally introduced errors.

A variety of GPS and GLONASS systems, including the lower cost GPS systems susceptible to SA as well as DGPS systems, are currently available, and any are suitable for use in this invention. A summary of satellite positioning systems, including GPS systems and GLONASS, and their operation is provided by Herring (February, 1996, Scientific American, 274(2):44–50) and by Muehrcke and Muehrcke (Map Use, Reading, Analysis, and Interpretation, 4th ed., JP Publications, Madison, Wis., 1998) the contents of each of which are incorporated by reference herein. Furthermore, for the purposes of this invention, it is understood that the use of the term GPS is intended to encompass all versions of GPS, including DGPS and other modified versions not susceptible to SA.

The accuracy of current GPS data without an ionosphere correction allows boundary lines to be created that may be subject to an error up to ±100 meters. This error range or width, though not as narrow as conventional fencing, is acceptable for most management situations involving vast areas over which free-ranging animals must be controlled. Thus, use of less costly GPS systems subject to SA may be preferred as a cost saving measure. These systems may also be preferred in view of the anticipated removal of SA from the GPS signal within the near future by the U.S. military. However, where a higher degree of resolution and control is desired, use of systems not susceptible to SA, such as DGPS, codeless systems, or GLONASS, may be preferred. If using DGPS, appropriate modifications to the system, especially wireless RF communication links mentioned hereinbelow can be readily added to allow the invention to accommodate DGPS data.

FIG. 2 illustrates the error introduced into the determination of the animal's position and the position of the boundary line or line of demarcation (5) to that of a virtual center line (6) as a result of the presence of SA in the GPS signal. In the absence of SA or in GPS systems such as DGPS which incorporate corrections for SA, the system error experienced in determining the location of the boundary line and the animal's position relative thereto is minimal. However, as a consequence of SA, the boundaries recognized by the system may fluctuate a variable distance, ±100 m, about the actual coordinates of the desired boundary line (5). Thus the fluctuating line corresponding to the boundary line may be referred to as a virtual center line (6), and the region surrounding it may be referred to as a virtual boundary. Initially the virtual center line programmed into the invention's microprocessor is identical in location to the line of demarcation (5) separating the two zones (FIG. 1). Over time, SA may allow the virtual center line (6) to move. In FIG. 2 it is shown to have moved up to 100 meters to the west of the line of demarcation (5; i.e., creating a distance of approximately 200 m between the edge of a virtual boundary and the actual boundary line). As the easterly moving animal penetrates the virtual boundary at the threshold line for sound (3') it initially receives acoustic aversive stimuli directed toward its left ear (bilaterally). In this example sound altered the animal's bearing of travel and it does not penetrate further into the virtual boundary. The direction of travel of the animal indicates sound alone altered the animal's bearing and it subsequently began moving in a westerly and then southerly direction outside of the virtual boundary. Once out of the virtual boundary all aversive stimuli cease.

Once the position data has been received from the satellite positioning system, it must be related to the position of the desired boundary and/or threshold lines. In accordance with the preferred embodiment, this is readily accomplished using optional map-analysis software commonly referred to as Geographical Information System (GIS) data. In brief, GIS are databases which provide a common spatial coordinate system as the primary means of reference and can provide a complete picture of a specific area under consideration. A typical GIS contains subsystems for data input, data storage, data manipulation (both numerical and graphical), and data reporting and representation. A description of GIS is described by Muehrcke and Muehrcke (ibid, note chapter 19) and Burrough and McDonnell (Principles of Geographical Information Systems, Oxford University Press, Oxford, 1998), the contents of each of which are incorporated by reference herein.

In the preferred embodiment, the position of the boundary lines representing specific longitude and latitude values may be programmed into the microprocessor using GIS data. During operation, the device consistently monitors incoming GPS data for the animal's position and compares it to GIS information that references the location of the closest boundary line.

A variety of GIS software products are commercially available and are suitable for use herein. A description of GIS and some downloadable GIS software are provided by the U.S. Geological Survey, Reston, Va., http://www.usgs.gov/. Without being limited thereto, other GIS systems which may be used include ARC/INFO or ArcView (both from Environmental Systems Research Inst., Redlands, Calif.), and IDRISI (The Clark Labs for Cartographic Technology and Geographic Analysis, Clark University, Worcester, Mass.).

The apparatus for practicing the invention typically includes a bilateral stimulus unit for applying an aversive stimulus to the animal, in combination with a satellite positioning system receiver for determining the animal's position, and a microprocessor in communication with both of these components. These units may be constructed into a single integral device worn by the animal, or they may be separated from one another, with the satellite positioning receiver and stimulus unit being mounted on the animal independently from one another. Furthermore, while the microprocessor is also preferably mounted on the animal, it is understood that it could be centrally located apart from the animal, communicating with the satellite positioning receiver and the stimulus unit through wireless links. However, the microprocessor must be mounted on the animal and can not be located apart from the animal if autonomous functioning of the system is to take place apart from human intervention. Each of these components, as well as other optional elements, are described in greater detail hereinbelow.

The bilateral stimulus unit includes at least two independently operable or actuated stimuli generators which are spaced apart from one another and are effective for selectively applying one or more aversive sensory stimuli onto either the left or right side of an animal. Stimulus units suitable for use herein must be capable of generating a stimulus or signal that the animal can not only perceive, but also differentiate the side to which it is applied. To aid the animal in discriminating between the right and left side stimuli the aversive stimuli may differ in specific characteristics between the two sides. A variety of stimuli generators are suitable for use herein. However, electric shock generators such as electrodes or electrode surfaces, and acoustic generators such as piezo transducers, amplifiers or speakers, are preferred. Other suitable stimuli generators may include but are not limited to vibrators or oscillators, pricking devices, and pinching devices. An optional time-out feature designed into the aversive stimulus unit ensures humane animal treatment will occur if the system malfunctions or the animal refuses to leave a zone of exclusion if it is entered.

The construction of the stimulus generators for administering an aversive electric shock stimulus or an acoustic stimulus per se is not critical. A variety of previously described electric shock and/or acoustic simulators are suitable for use herein. For example, without being limited thereto, electric and/or stimulus generators which may be used include those described in the following U.S. Pat. Nos. 5,682,839; 5,067,441; 5,408,956; 5,193,484; 5,575,242; 5,576,694; 5,608,381; 5,435,271; 4,802,482; 5,559,498; 4,898,120; 5,121,711; 5,465,687; 5,241,923; 5,565,850; 5,067,441; and 3,980,051, the contents of each of which are incorporated by reference herein. The skilled practitioner will recognize that the efficacy of any one type of electrode may vary as a result of several factors that influence electrical conductivity between the electrode and the animal including: differences in the density of nerve endings at various locations on the skin surface, variation in hair coat and skin thickness between animals, and differences in moisture conditions of the hair and skin as affected by humidity and precipitation. The optimal electric stimulus generators for use herein may therefore be selected by the practitioner cognizant of these factors. However, a pair of spring loaded electrodes or electrode surfaces delivering electric shock of high voltage and low amperage that can be generated mechanically or electronically to stimulate undifferentiated nerve endings and initiate the sense of pain are generally preferred.

A satellite positioning system receiver which is effective for determining the position of an animal is also included in the device to be mounted thereon. The particular receiver and its location on the animal is not critical, although the antenna should be positioned to maintain its orientation toward the incoming satellite signals. With newer active GPS antenna designs they are not as sensitive to orientation as the older passive GPS antennas, thus giving more flexibility as to where their location may be on the animal. Therefore, at least the antenna will be typically mounted at the top of the animal's torso, neck, or head, or on or in the horns or antlers. A variety of satellite positioning system receivers are commercially available which are suitable for use herein, including GPS systems (such as low cost GPS or DGPS) and GLONASS systems. For example, without being limited thereto, one such commercially available GPS unit which is suitable for use is the DeLorme's TRIPMATE (DeLorme, Yarmouth, Me.).

A microprocessor based computer control unit (central processing unit) is provided for receiving data indicative of the position of the animal from the satellite positioning system receiver, interpreting the data, and selectively controlling the activation of the stimuli generators. Conventional interface hardware are also provided allowing communication between the microprocessor and both the bilateral stimulus units and the satellite positioning system receiver. The microprocessor includes hardware and software effective for determining the direction of movement of the animal, comparing its position with the position of the predetermined boundary lines to determine the closest boundary line and the distance of the animal therefrom, determining which side of the animal is nearest to the closest boundary line, and selectively initiating control signals for activating the appropriate stimuli generators (in response to the determinations of the distance from the closest boundary line and which side of the animal is nearest to that line). The microprocessor should also include a system database for storing sensor and satellite positioning system data, system parameters, and GIS data (optional), as well as an operating system for scheduling software functions and the driver routines for the device's peripherals (such as the aversive stimuli generators, satellite positioning system receiver, RF and IR transceivers, and a magnetometer).

The microprocessor is preferably constructed with a communications link or input allowing it to be interrogated and/or reprogrammed by the user. For instance, the inclusion of the communications link or input will enable the user to download specific positions (e.g., GIS coordinates) of desired boundary lines and/or threshold lines, uploading all logged sensor and satellite positioning system data, changing the characteristics of the applied stimuli, and/or reprogramming of embedded computer system parameters.

In the preferred embodiment, hardwired or wireless data communications links are included in the device to allow communication with a dedicated hand-held device or external computer. In a particularly preferred embodiment, the data communications link between the microprocessor and the external world include RF (portable radio and cellular telephones) or infrared (IR) transceivers. For example, by using an IR transceiver the microprocessor may communicate through a wireless link with any lap top computer equipped with an IrDA interface. The user may directly access the microprocessor through cellular communication links, or communication may be automatically established with the animal whenever it passes through a predetermined area. In either case it is possible to interrogate and reprogram the invention's CPU without physically removing the invention from the animal. Alternatively, it is also understood that the communication input may include plug ins for manually operated keyboards or inserted modules.

The microprocessor is preferably of a modular design, facilitating the addition of memory and/or sensors using plug in modules, and state-of-the-art upgrades, with minimal software modification.

The satellite position system receiver and aversive stimuli units may be directly joined with the microprocessor as a single unit, or they may be separated. With respect to the latter, the units may be miniaturized and connected through wireless communication. For example, Anderson (U.S. Pat. No. 5,721,783) described a system which is suitable for use herein for transferring electronic signals within the animal's body to activate aversive stimuli transponders located in remote areas of the animal's body.

Power to operate the right and left aversive stimuli units, satellite positioning receiver, and microprocessor of the invention may be obtained from conventional power supplies. Typically, power will be supplied using onboard batteries. In a preferred embodiment, the power supply will include a solar cell or panels to trickle charge the batteries, thus reducing the number of times animals wearing the device must be restrained to service batteries. External power jacks may also be added to facilitate recharging of the batteries. During use, battery voltage and current readings may be monitored by the microprocessor and communicated to the user through the above-mentioned communications links.

A variety of commercially available batteries are suitable for use herein, including but not limited to nickel cadmium and nickel metal hydride batteries, lithium ion batteries, and the most recent all-polymer batteries also known as an Integrated Power Source (IPS) with plastic characteristics that employ light weight solid substance electrolytes, not fluids, capable of accepting multiple charging and discharging cycles. The solid substance polymer batteries lend themselves to be custom conformed, fit, or tailored to many applications. It is envisioned that these polymer batteries may allow the housing, battery and charge management system to be constructed as a wholly integrated assembly, with the batteries also serving as a housing for the electronics.

The invention's power management software and hardware system preferably include an optional motion detector (accelerometer), timer and electronic compass (magnetometer) for selectively de-energizing at least a portion of the circuitry of the unit in response to sensing persistent inactivity of the animal. For instance, in use the device consistently monitors incoming satellite positioning system data and compares it to GIS information that references the location of the closest boundary line. Should the animal cease to move for a pre-programmable period of time the system will automatically switch into a standby mode thus conserving battery power. Once movement is again detected over a predetermined time interval (usually several seconds) full operation of the system is reinstated (the microprocessor is activated, the satellite positioning system receiver is powered-up, and the magnetometer (electronic compass) is interrogated by the embedded computer).

In an alternative embodiment, the device may also include an RF transponder which is effective for interfacing or communicating with similar devices worn by other animals or with a central microprocessor. This capability allows automated management including: herding over space and time, selective breeding among multi-sire herds and manipulating spatial density among foraging groups.

Figure 3:
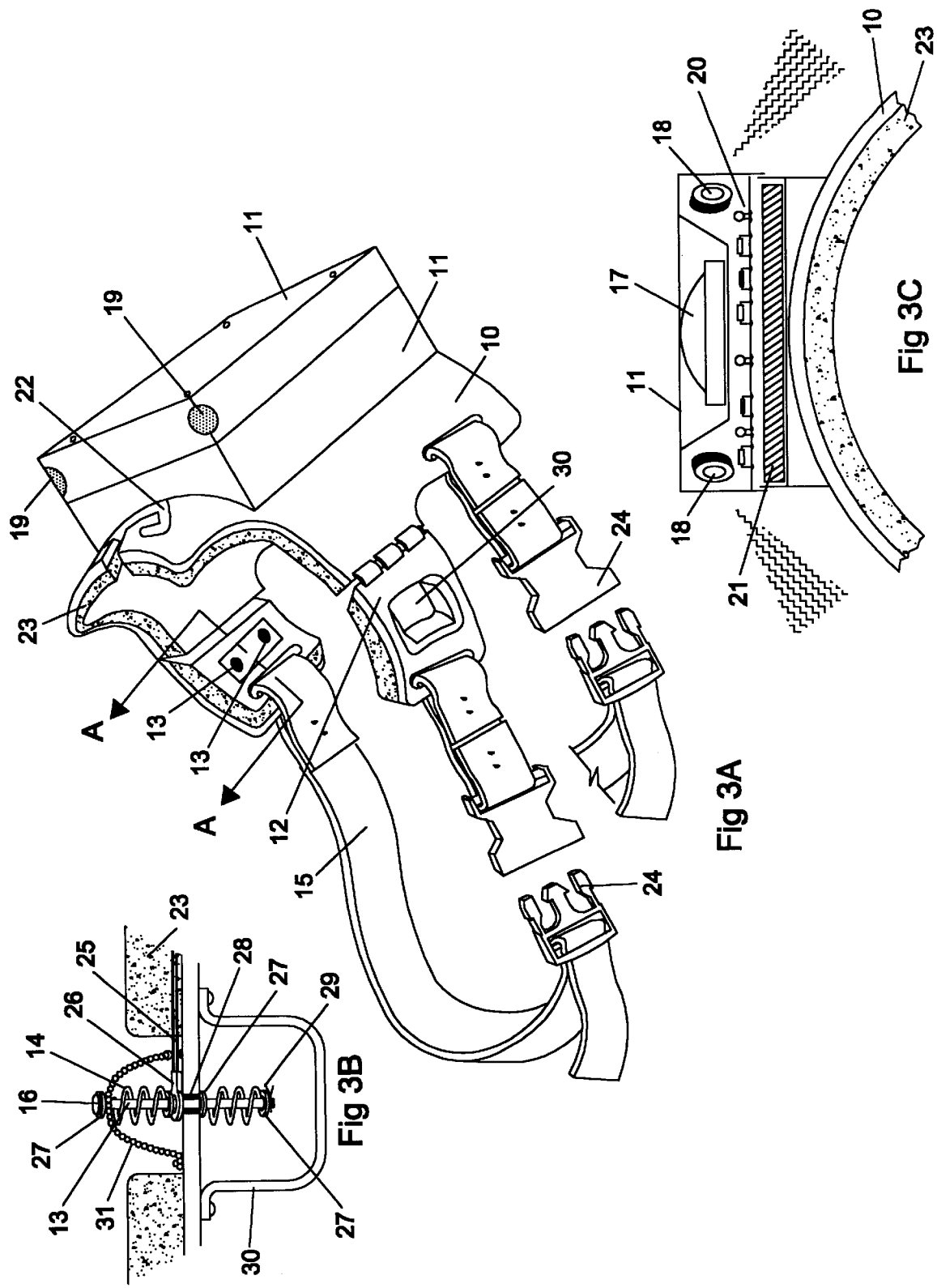
FIG. 3A shows a left-hand front perspective of a padded (23) neck saddle (10) that together with a groove (22) through which a halter can be fastened secures the saddle to the animal's neck with buckles (24) that can be adjusted on the belting (15) to secure the saddle to the animal's neck. This housing contains the invention, expanded views are shown in FIGS. 3B and 3C, respectively.
FIG. 3B shows one spring (14) loaded electrode (13) and associated parts including the electrode foot (16), bushing (28), washers (27) and cotter pin (29) to hold tension on the spring. An insulated wire (25) attached to the electrode shaft (13) through an electrical grommet (26) provides the current to supply the electric shock. This shock delivery mechanism for administering an electric shock (Section A—A, FIG. 3B) is part of a hinged side strap (12) in which the electrodes (13) are protected by rigid (30) and insulated (31) boots.
FIG. 3C shows a cross section of the electronics compartment (11) located on top of the neck saddle (10) that contains the Global Positioning System (GPS) antenna (17), acoustic piezo transducers (18) with covers (19), central processing hardware/software electronic components (20) and battery (21).
Figure 4:
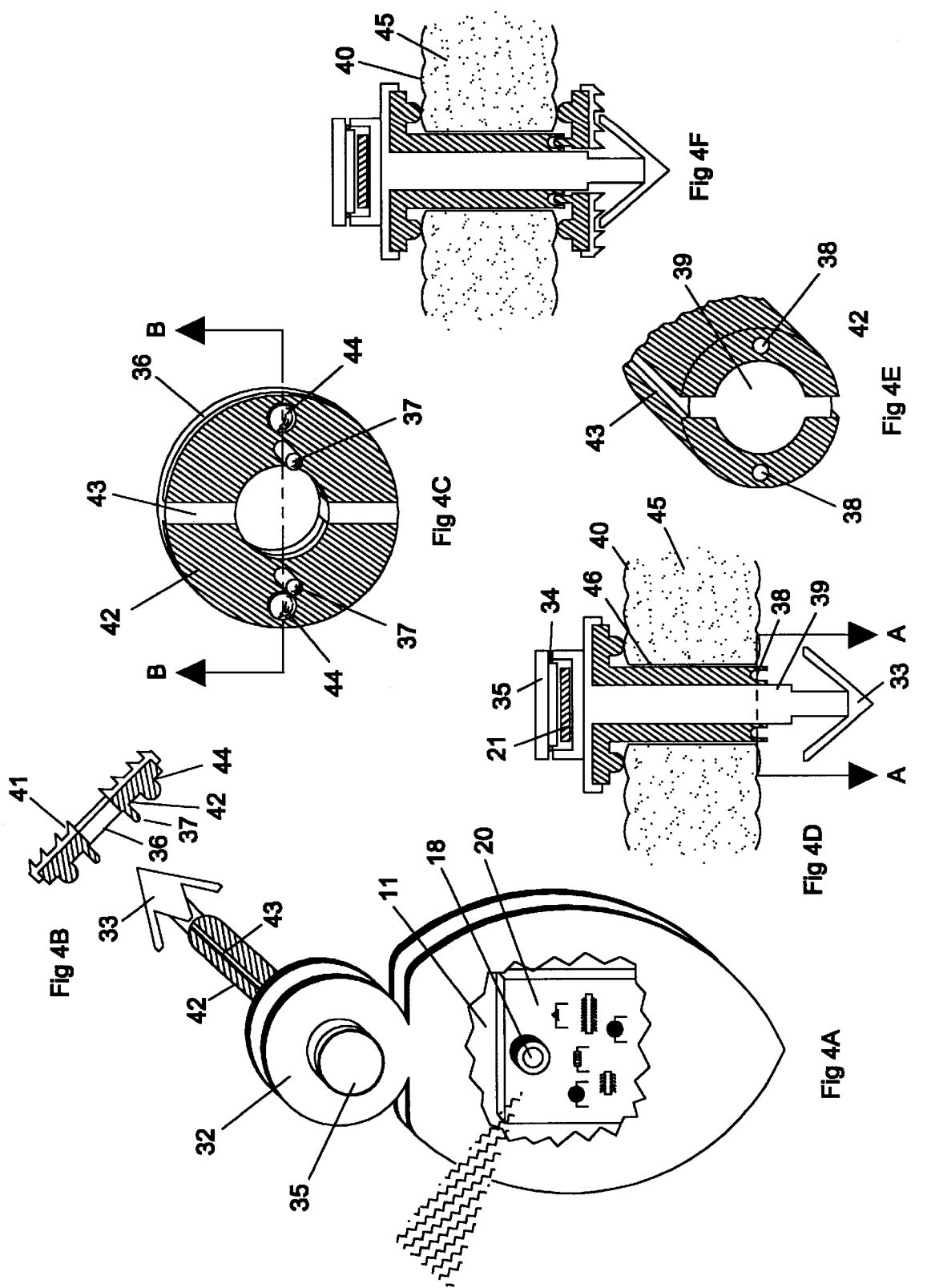
FIG. 4A shows a front view (Detail 1) of the male portion (32) of a two-piece ear tag designed with electronic components (20) to provide both acoustic (18) and electric shock even following scar tissue (46) formation when activated by electronics housed in the neck saddle (10), or a suitable housing located elsewhere on the animal and controlled by Radio Frequency (RF) from the Global Positioning System (GPS) satellites. The ratchet (41) designed retention ring (36) with electrode ball ends (44) shown in FIGS. 4B and 4C secures the electronic ear tag to the animal's ear and provides a means to conduct electricity along the surface (42) of the non-conducting stud shaft (39) and associated parts having air gaps (43) when aversive electric stimuli are required.
FIG. 4D is a longitudinal section through the stud shaft (39), ear and battery compartment cover (35), battery (21), and weather seal (34) without the retention ring (36).
FIG. 4E is a cross section of the stud shaft immediately behind the "V" shaped rigid winged stud tip (33) into which the retention ring (36) fits guided by the pin (37) connection located on the retention ring (36) and socket (38) connectors located on the stud shaft.
FIG. 4F represents a saggital section (45) of the ear tag secured in place through the ear pinna surface (40).
Figure 5:
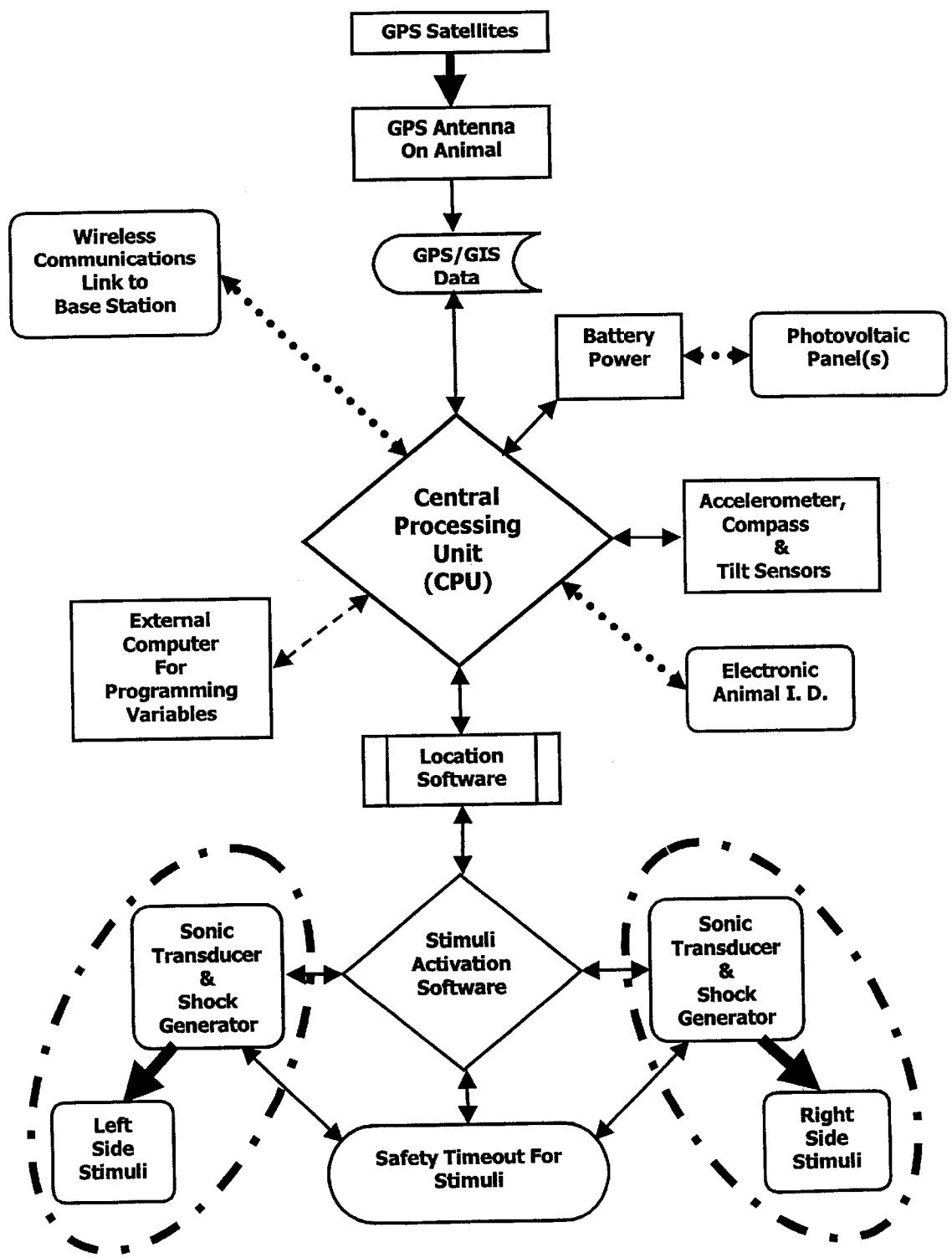
FIG. 5 shows a schematic flowchart of components comprising the invention and their functional relationship to one another. Components shown as being connected to the figure with dotted arrows are optional, while the dashed arrow indicates an external computer not physically part of the neck saddle (10) or ear tag (FIG. 4). The dotted ellipses focus on the invention's design to apply aversive stimuli on either the right or left sides (heavy solid arrow lines) of the animal (bilaterally).

The satellite positioning receiver, stimuli generators, microprocessor, and other components may be securely mounted onto the animal's head or body (including the torso, legs, or neck) using a variety of different supports. The particular support for mounting the device's generators is not critical, but it should be capable of securely retaining each stimuli generator oriented on one selected side of the animal without inadvertently slipping or reversing the original orientation. When using electric shock stimuli, the support should also be effective for retaining the stimulus units in contact with the animal. As shown in the embodiments of FIGS. 3 and 4, neck saddles (or harnesses) and ear tags are preferred for use as supports. Although not shown, in another preferred embodiment, the support may be adapted to fit into the ear canal of the subject animal, similar to a hearing aid. Other supports which may be used include but are not limited to, housings or compartments which may be implanted, collars, shoulder harnesses, saddles fitting over the torso, and leg bands. The support may preferably include one or more electronics compartments into which the components such as the satellite positioning system receiver, the microprocessor, and electronics to generate and activate the stimuli units, may be placed.

Representative examples of two preferred embodiments of the invention are shown in FIGS. 3 and 4 and described below. These examples are intended only to further illustrate the invention and are not intended to limit the scope of the invention which is defined by the claims.

FIG. 3 shows the device worn by the animal as a neck saddle. The neck saddle (10) is constructed of a molded composite plastic polymer. It is attached to the animal's neck with adjustable belting (15) equipped with a pair of quick release buckles with male and female ends (24). This embodiment provides a base for the electronics compartment (11) atop the saddle, positions the GPS antenna (17) skyward, and supports the aversive stimuli transducers (13 and 18). One pair of electrodes (13) is attached to the right side on a hinged side strap (12) while a second pair is attached in the same fashion to the left side hinged side strap (12). Acoustic piezo transducers (18) are also located anteriorly on opposite sides of the electronics compartment (11) for generating acoustic stimuli to the right or left side of the animal (FIG. 3C).

Acoustic energy is transmitted from one of the piezo transducers (18), in the default mode, beginning at a low frequency and sound pressure level and steadily increased in frequency and sound pressure level through its operational bandwidth. The electrode pairs (13) are spring loaded (FIG. 3B) and deliver an electric shock to one side of the head and/or neck region. Electrode pairs are positioned on the right and left sides of the animal's neck proximal to the head and ear. Together with the hinged side straps (12) and elastic belting (15) material that secures the neck saddle (10) to the animal's neck these electrodes remain in intimate contact with the animal's skin at all times without causing undue irritation to the skin since the point of contact is a flattened area or electrode foot (16).

Housed within the electronics compartment and diagramed in cross section in FIG. 3C are the electromechanical components necessary to operate the system autonomously, including the GPS antenna (17), acoustic piezo transducers (18) located behind the acoustic piezo transducer covers (19), electronic components (20), and battery (21) necessary to power the system. Also housed within the electronics compartment (11) are backup hardware and software to provide accurate motion (accelerometer) and direction (compass) data that can not be obtained solely by GPS at low velocities (walking) characteristic of free-ranging animal movement. A groove (22) in the top front of the neck saddle (10), through which the head stall of a common rope halter can be diverted, insures the GPS antenna (17) remains directed skyward at all times.

The underside of the saddle is padded with a high density foam padding (23) to prevent abrasion to the animal's neck skin. The neck saddle (10) is secured in the upright position to the animal's neck with two pieces of elastic belting (15). The belting is adjusted for proper length to fit around the animal's neck by having its opposite ends detachably and adjustably connected together by a buckle with male and female ends (24). To further ensure the saddle remains upright on the animal's neck at all times the front of the saddle can be fastened to a halter by running the portion of the halter that goes over the animal's head and behind its ears through the groove (22) cut into the front of the neck saddle (10).

FIG. 3B shows a detailed construction of an electrode (13) used to deliver electronic shock generated in the electronic components (20) housed in the electronics compartment (11) to the electrode foot (16) end of the electrode shaft. The electrodes are designed (spring loaded) to remain in constant contact with the animal's skin yet are not to be rigid but move in and out against the animal's skin based on the tension maintained in the elastic belting (15) that attach the neck saddle (10) to the animal. The electric signal (shock) is delivered to a spring loaded electrode (13) via an insulated wire (25) that is run between the hinged side strap (12) of the neck saddle (10) and the high density foam padding (23). To maintain electrical continuity throughout this system an electrical grommet (26) soldered to the end of the insulated wire (25) ensures electrical conductivity is consistently maintained between the electrode foot (16) and the source of the electric shock when needed. This attachment eliminates rigid attachment points that could break with fatigue because of the constant in and out flexing of the electrodes as they remain in contact with the animal's neck skin.

Electrode movement results from the two springs (14) being placed under tension on either side of the hinged side straps (12). The straps provide support to the electrodes and focus the electric shock to the dorsal and anterior portion of the animal's neck. Metal washers (27) placed on either end of each of the two springs through which the metal electrode pass ensures the electrode shaft does not bind in its movement. To further enhance free movement the electrode shaft as it passes through the hinged side strap (12), it passes through a non metallic bushing (28) that lines the hole. A cotter pin (29) placed through a hole in the electrode shaft opposite the electrode foot (16) maintains tension on the springs.

To eliminate the accumulation of debris in the springs, which might reduce the electrode design's flexibility, covers are provided. The spring exposed to the outside of the animal's neck is covered by a rigid, preferably molded plastic, boot (30). This provides protection to the electrodes should the animal rub its neck on solid objects. The insulated flexible boot (31) covering the spring located inside the hinged side strap (12) allows for movement of the electrode shaft so the electrode foot (16) remains in constant contact with the animal's skin at all times. Furthermore this boot acts as an insulator surrounding the shaft of the electrode for the purpose of preventing shunting of the electroshock signal when the animal's hair is wet. Without such protection the low parallel resistance between the two electrodes by wet conductive hair could shunt a large portion of the electroshock current away from the point of contact with the animal's skin thus greatly decreasing the shock stimuli that are actually being applied to the neck of the animal.

FIG. 4 shows the device worn by the animal as ear tags. Ear tags may be used to administer aversive stimuli (acoustic and/or electrical) in conjunction with or in place of aversive stimuli transducers housed in the neck saddle (10). In this example the GPS antenna (17) is located in the electronics compartment (11) of the neck saddle (10) while all of the other electro-mechanical components are housed within the plastic male ear tag body having a non-metal stud core. However, it is understood that the antenna may be located elsewhere on or in the animal. This male body portion of the ear tag consists of three layers. The front and back water proof covering is formed of a pliable UV resistant plastic. Heat sealed between these two layers is the electronic compartment's (11) hardware together with the acoustic piezo transducer (18). Activation of the electronic components (20) in the ear tag is accomplished using a RF signal generated by the electronic components (20) housed in the neck saddle (10) or other convenient location on the animal. The ear tag is powered by a battery (21). Bilateral aversive stimulation is accomplished through right and left ear tags.

The ear tag contains a microcomputer, acoustic transducer, shock transducer and RF receiver in a weather sealed box located in the electronics compartment (11) and battery (21). Acoustic energy is transmitted from an acoustic piezo transducer (18), while the cylindrical "V" shaped rigid winged stud tip (33) fastens both the left and right ear tags to the saggital section of the pinna or auricle (45) portion of the animal's ear. The barrel of the stud is covered with a conducting material to deliver electric shock to three distinct locations of the ear simultaneously. A small electrode ball end (44) contacts the surface of the pinna, intra ear electrode (42) surfaces contact the saggital section of pinna (45) tissue where the cylindrical pin pierces the ear, and where the pinna forms a dielectric between two electrode ball ends (44) placed on either side of the ear pinna. Varying levels of stimulation are determined by the duration of the acoustic and/or electric shock information.

The male ear tag body (32) with "V" shaped rigid winged stud tip (33), electronic components (20), an acoustic piezo transducer (18), battery (21) and a battery compartment (FIG. 4A) with a weather seal (34) and battery compartment cover (35) comprises half of the two-piece ear tag. A retention ring (36) composed of rigid plastic (FIGS. 4B, C and F) completes the ear tag and secures it to the animal's ear. This retention ring (36) could be modified to also provide the location of an electronic identification (ID) system. For example, without being limited thereto, one such commercially available Electronic ID unit which would potentially be suitable for use is the ALLFLEX Electronic Livestock Identification ear tags (Allflex, Dallas/Fort Worth Airport, Tex.).

Ear tags are attached to an animal's ear using appropriate commercially available plier-type applicators that force the "V" shaped rigid winged stud tip (33) through the ear (FIG. 4D). The male portion of the ear tag is positioned on one of the applicator's jaws while the retention ring (36) is held in place on the anvil portion of the applicator's other jaw. The two pieces of the ear tag are positioned on the applicator such that the pin connectors (37) located on the retention ring (36) are aligned with the socket connectors (38) bored through the electrode material surrounding the non conducting rigid stud shaft (39) core (FIGS. 4C and E). The ear pinna is sandwiched between the male ear tag body (32) and the retention ring (36) as the applicator's plier handles are brought together in a rapid, steady manner. The "V" shaped rigid winged stud tip (33) punctures the pinna surface (40) is driven through the ear and exits the opposite side of the ear through the rigid plastic retention ring (36). Once through the retention ring (36) the wings on the "V" shaped stud expand into the ratchet locking mechanism (41; FIG. 4F).

The non conducting rigid stud shaft (39) core of the male ear tag body serves two functions. It provides a means of attaching the two-piece ear tag to the animal's ear and it affords a substrate to which electrode surfaces (42) are attached. It is through contact of the animal's ear with the various electrode surfaces that electrical stimuli are applied. Electrode surfaces (42) are separated with an air gap (43) on the retention ring (36; FIG. 4C) and along the length of the "V" shaped rigid winged stud core (36; FIGS. 4A and E). When electric shock is administered, it is applied simultaneously from three current flow patterns. A surface shock is generated on both sides of the pinna between electrode ball ends (44). This pattern emulates current flow between the electrodes (13) of the neck saddle (10). In addition, electric shock is administered from the male ear tag body (32) as shown in the saggital section of the pinna (45) along the stud shaft that passes through the animal's ear in addition to a path through the pinna between electrode ball ends (44) on opposite sides of the ear.

The pin connectors (37) located on the retention ring (36; FIG. 4C) and socket connectors (38) located immediately behind the "V" tip on the stud shaft (FIG. 4E), insure electrical continuity to both sides of the ear at all times. The ratchet locking mechanism (41) on the outside of the retention ring (36) provides a means of adjusting the tension the electrode ball ends (44) exert on the pinna surface (40). Initially the "V" shaped rigid winged stud tip (33) would engage the ratchet locking mechanism (41) at its outer perimeter to allow for swelling following piercing of the ear. Once swelling has receded and scar tissue (46) forms around the opening through the ear the wings of the stud tip can be squeezed together to rachet the electrode ball ends (44) closer to the pinna surface (40) thus ensuring electrical contact when electric stimuli are required.

It is understood that the foregoing detailed description is given merely by way of illustration and that modifications and variations may be made therein without departing from the spirit and scope of the invention.

We claim:

1. A method for controlling the location and direction of movement of a subject animal comprising:
    a) providing an apparatus onto a subject animal which comprises a stimulus unit which is effective for selectively applying at least one aversive sensory stimulus onto one side of said animal;
    b) selecting a boundary line which said animal is not to cross and which separates a first area in which said animal is to be retained from a second area which said animal is to be excluded;
    c) selecting a first threshold line at which a first aversive stimulus is to be applied to said animal to deter said animal from crossing or approaching said boundary line, said first threshold line being the same as said boundary line or spaced outwardly of said boundary line within said first area;
    d) selecting one side of said animal for application of an aversive stimulus if the left side of said animal is nearest to said first threshold line or said boundary line while located within said first area, and the other side of said animal for application of an aversive stimulus if the right side of the animal is nearest to said first threshold line or said boundary line while within said first area;
    e) determining the position and direction of movement of said subject animal relative to said first threshold line and said boundary line;
    f) comparing said position of said animal determined in (e) with said first threshold line to determine when said animal contacts said first threshold line;
    g) comparing said direction of movement of said animal determined in (e) with said first threshold line and determining which side of said animal is nearest to said first threshold line;
    h) applying said first aversive stimulus to the left side or the right side of said animal with said stimulus unit to cause said animal to move in a direction away from said boundary line if said animal contacts said first threshold line, said first aversive stimulus being applied to said one side of said animal if the left side of said animal is substantially nearer to said first threshold line than its right side, to the other side of said animal if the right side of the animal is substantially nearer to said first threshold line than its left side, or to an arbitrarily selected side of said animal if said right side and left side of said animal are approximately equidistant from said first threshold line.

2. The method of claim 1 wherein said apparatus further comprises a satellite positioning system receiver, and said position of said animal is determined in (e) by said satellite positioning system receiver.

3. The method of claim 2 wherein said apparatus further comprises a microprocessor in communication with said satellite positioning system receiver and said stimulus unit, said microprocessor receiving the data from said satellite positioning system receiver, and controlling the application of said aversive stimulus by said stimulus unit in (g).

4. The method of claim 1 wherein the side of said animal which is nearest to said first threshold line is determined in (g) by determining an angle of incidence, $\theta$, between said first threshold line and said direction of movement of said animal at the point of contact with said first threshold line, and said aversive stimulus is applied to said animal in (h):

1) on said one side of said animal if said angle of incidence, θ, is substantially less than 90° when measured between said left side of said animal and said first threshold line, to cause said animal to move in a direction away from said angle of incidence, 2) on said other side of said animal if said angle of incidence, θ, is substantially less than 90° when measured between said right side of said animal and said first threshold line, to cause said animal to move in a direction away from said angle of incidence, or 3) on an arbitrarily selected side of said animal if said angle of incidence, θ, is approximately 90°.

5. The method of claim 1 wherein said first threshold line is the same as said boundary line.

6. The method of claim 1 wherein said first threshold line is spaced outwardly from said boundary line within said first area, and said threshold line and said boundary line define a threshold area therebetween.

7. The method of claim 6 further comprising:
   i) determining when said animal crosses over said first threshold line into said threshold area;
   j) comparing said direction of movement of said animal with said boundary line and determining the direction of movement relative to said boundary line and which side of said animal is nearest to said boundary line; and
   K) continuing the application of said aversive stimulus in (h) if said animal moves within said threshold area, said stimulus being applied to said one side of said animal if the left side of said animal is substantially nearer to said boundary line than its right side, to said other side of said animal if the right side of said animal is substantially nearer to said boundary line than its left side, or to an arbitrarily selected side of said animal if said right side and left side of said animal are approximately equidistant from said boundary line.

8. The method of claim 7 wherein the intensity of said aversive stimulus is increased if said animal moves closer to said boundary line.

9. The method of claim 6 further comprising:
   i) selecting a second threshold line at which a second aversive stimulus is to be applied to said animal to further deter said animal from crossing said boundary line, said second threshold line being the same as said boundary line or spaced intermediate between said first threshold line and said boundary line within said first area;
   j) determining the position and direction of movement of said animal relative to said second threshold line;
   k) comparing said position of said animal determined in (j) with said second threshold line to determine when said animal contacts said second threshold line;
   l) comparing said direction of movement of said animal determined in (j) with said second threshold line and determining which side of said animal is nearest to said second threshold line;
   m) applying said second aversive stimulus to the left side or the right side of said animal with said stimulus unit to cause said animal to move in a direction away from said boundary line if said animal contacts said second threshold line, said second aversive stimulus being applied to said one side of said animal if the left side of said animal is substantially nearer to said second threshold line than its right side, to the other side of said animal if the right side of the animal is substantially nearer to said second threshold line than its left side, or to an arbitrarily selected side of said animal if said right side and left side of said animal are approximately equidistant from said second threshold line.

10. The method of claim 9 wherein the side of said animal which is nearest to said second threshold line is determined in (l) by determining an angle of incidence, α, between said second threshold line and said direction of movement of said animal at the point of contact with said second threshold line, and said second aversive stimulus is applied to said animal in (m):
    (1) on said one side of said animal if said angle of incidence, α, is substantially less than 90° when measured between said left side of said animal and said second threshold line,
    (2) on said other side of said animal if said angle of incidence, α, is substantially less than 90° when measured between said right side of said animal and said second threshold line, or
    (3) on an arbitrarily selected side of said animal if said angle of incidence, α, is approximately 90°.

11. The method of claim 9 wherein said second threshold line is the same as said boundary line.

12. The method of claim 9 wherein said second threshold line is spaced outwardly from said boundary line within said first area, and said threshold line and said boundary line define a secondary threshold area therebetween.

13. The method of claim 12 wherein the intensity of said second stimulus is increased if said animal moves closer to said boundary line.

14. The method of claim 9 wherein said second stimulus causes greater discomfort to said animal than said first stimulus.

15. The method of claim 9 wherein said first aversive stimulus is an acoustic stimulus and said second aversive stimulus is an electric shock stimulus.

16. The method of claim 1 wherein said aversive stimulus is selected from the group consisting of an acoustic stimulus, an electric stimulus, and combinations thereof.

17. The method of claim 1 wherein said animal has been trained to enhance said animal's instinctive response to move to its right upon application of an aversive sensory stimulus to said one side thereof, and to move to its left upon application of an aversive sensory stimulus to its said other side, and said one side of said animal is the left side thereof and said other side of said animal is the right side thereof, such that said aversive stimulus is applied to the left side of said animal in (h) if the left side of said animal is substantially nearer to said first threshold line than its right side, or to the right side of said animal in (h) if the right side of the animal is substantially nearer to said first threshold line than its left side.

18. The method of claim 1 wherein said animal is selected from the group consisting of wild and domestic livestock.

19. The method of claim 1 wherein said animal is selected from the group consisting of primates, perissodactyla, and artiodactyla.

20. The method of claim 19 wherein said animal is selected from the group consisting of bovines, equines, caprines, ovines, and porcines.

21. An apparatus for controlling the location and direction of movement of an animal comprising:
    a) a bilateral stimulus unit comprising first and second independently operable stimuli generators effective for selectively applying at least one aversive sensory stimulus onto one side of an animal;
    b) a satellite positioning system receiver effective for determining the position of an animal, wherein said bilateral stimulus unit and said satellite positioning system receiver are adapted to be worn by said animal; and c) a microprocessor in communication with said bilateral stimulus unit and said satellite positioning system receiver; said microprocessor having input therein i) the position of at least one predetermined boundary line which said animal is not to cross and which separates a first area in which said animal is to be retained from a second area which said animal is to be excluded, ii) the position of a first threshold line at which a first aversive stimulus is to be applied to said animal to deter said animal from crossing or approaching said boundary line, said first threshold line being the same as said boundary line or spaced outwardly of said boundary line within said first area, and iii) a selected one side of said animal for application of an aversive stimulus if the left side of said animal is nearest to said first threshold line or said boundary line while located within said first area, and the other side of said animal for application of an aversive stimulus if the right side of the animal is nearest to said first threshold line or said boundary line while within said first area; and wherein said microprocessor is programmed to:

1) receive data indicative of the position of said animal from said satellite positioning system receiver for determining movement and direction of said animal relative to said first threshold line and said boundary line;

2) compare the position of said animal determined in (1) with the position of said first threshold line to determine when said animal contacts said first threshold line;

3) compare said direction of movement of said animal determined in (1) with said first threshold line and determine which side of said animal is nearest to said first threshold line; and 4) selectively activate one of said first or second stimuli generators in response to the determination of the distance from said closest boundary line and the determination of which side of the animal is nearest to said closest boundary line, to apply said first aversive stimulus to the left side or the right side of said animal to cause said animal to move in a direction away from said boundary line if said animal contacts said first threshold line, said first aversive stimulus being applied to said one side of said animal if the left side of said animal is substantially nearer to said first threshold line than its right side, to the other side of said animal if the right side of the animal is substantially nearer to said first threshold line than its left side, or to an arbitrarily selected side of said animal if said right side and left side of said animal are approximately equidistant from said first threshold line.

22. The apparatus of claim 21 further comprising microprocessor communication input.

23. The apparatus of claim 21 further comprising a support onto which said stimulus unit is mounted and which said support may be worn by said animal.

24. The apparatus of claim 23 wherein said support is worn about the body, neck or head of said animal.

25. The apparatus of claim 21 further comprising a pair of supports to be worn on or in the ears of said animal, and onto which said first and second stimuli generators are mounted.

26. The apparatus of claim 21 wherein said first and second independently operable stimuli generators are selected from the group consisting of electric shock generators, acoustic generators, and combinations thereof.

27. The apparatus of claim 21 wherein said first and second stimuli generators are autonomously operable.

* * * * *